UNITED STATES PATENT OFFICE 2,312,696

REACTION PRODUCT OF ALDEHYDES AND TRIAZINE DERIVATIVES

Gaetano F. D'Alelio, Pittsfield, Mass., assignor to General Electric Company, a corporation of New York No Drawing. Application November 19, 1941, Serial No. 419,724

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and an organic compound corresponding to the following general formula:

I 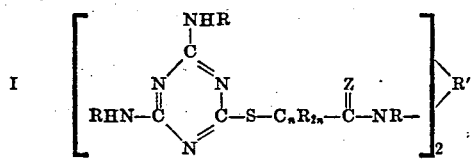

In the above formula $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, and R' represents a member of the class consisting of divalent hydrocarbon and substituted hydrocarbon radicals, more particularly halo-hydrocarbon radicals. Since $n$ represents an integer which is 1 or 2, it will be seen that the linkage of the sulfur atom to the carbamyl-alkyl or thionocarbamyl-alkyl grouping in all cases will be alpha or beta to the carbamyl or thionocarbamyl grouping. It also will be observed that the amino (—NHR) groups and the sulfur atom are attached directly to a carbon atom of the triazine nucleus.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g. tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in the above formula is hydrogen. Also especially suitable for use in carrying the present invention into effect are organic compounds corresponding to the general formulas:

II 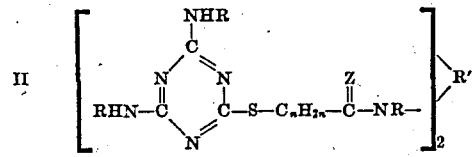

and, more particularly,

III 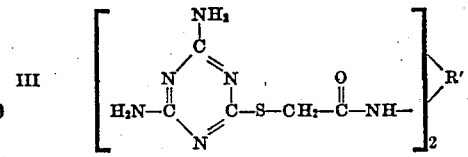

where $n$, Z, R and R' have the same meanings as given above with particular reference to Formula I.

Illustrative examples of divalent radicals that R' in the above formulas may represent are divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenylpropylene, naphthylisobutylene, xylylene, alpha-(4 - tolylene) beta'-butyl, etc.; radicals that may be classed either as divalent aromatic-substituted aliphatic or divalent aliphatic-substituted aromatic, e. g., 4, alpha-tolylene, 3, beta-phenyleneethyl, 4, alpha-xylylene, 2-gamma-phenylene-butyl, etc.; and their homologues, as well as those divalent radicals with one or more of their hydrogen atoms replaced by a substituent, e. g., halogeno, amino, acetyl, acetoxy, carbalkoxy, alkoxy, aryloxy, hydroxy, alkyl, alkenyl, etc. Specific examples of substituted divalent radicals are chloroethylene, chloropropylene, bromobutylene, chlorophenylene, chlorotolylene, bromophenylene, chloronaphthylene, bromonaphthylene, bromo 1, 4-tolylene, chlorocyclopentylene, chloropentenylene, carbomethoxyphenylene, ethoxyphenylene, acetophenylene, acetoxyphenylene, bromocyclopentylene, aminophenylene, phenoxyphenylene, methylphenylene (tolylene), allylphenylene, etc. Preferably R' is ethylene, phenylene or tolylene.

Instead of the symmetrical triazines (s-triazines) represented by the above formulas, corresponding derivatives of the asymmetrical and vicinal triazines may be used. Also, instead of using compounds wherein there is only one thio linkage connecting the triazine nucleus with the alkylamido or alkylthionoamido grouping, I may use compounds wherein there are two or three sulfur atoms connecting the triazine nucleus with two or three, respectively, alkylamido or alkylthionoamido groupings.

The triazine derivatives that are used in carrying the present invention into effect are more fully described and claimed in my copending application Serial No. 418,220, filed Nov. 7, 1941, and assigned to the same assignee as the present invention. As pointed out in this copending application, the triazine derivatives employed in practicing the present invention are prepared by effecting reaction, in the presence of a hydrohalide acceptor, e. g., an alkali-metal hydroxide, between (1) a bis-halogeno alkylamido)-substituted divalent hydrocarbon or a bis-(halogeno alkylthionoamido)-substituted divalent hydrocarbon and (2) a mercapto diamino s-triazine, the reactants being employed in the ratio of at least two mols of the mercapto diamino s-triazine for each mol of the said substituted divalent hydrocarbon. The reaction preferably is effected in the presence of a suitable solvent or mixture of solvents, e. g., water or a mixture of water and alcohol.

Specific examples of bis-(triazinyl thio alkylamido) and bis-(triazinyl thio alkylthionoamido) derivatives of divalent hydrocarbons that may be used in producing my new condensation products are listed below:

Bis-(diamino s-triazinyl thio acetamido ethane, more particularly alpha, beta-bis-(diamino s-triazinyl thio acetamido) ethane Bis-(diamino s-triazinyl thio acetothionoamido) ethane, more particularly alpha, beta-bis-(diamino s-triazinyl thio acetothionoamido) ethane.

Bis-(diamino s-triazinyl thio acetothionoamido) propanes

Bis-(diamino s-triazinyl thio acetamido) propanes

Bis-(diamino s-triazinyl thio acetamido) butanes

Bis-(diamino s-triazinyl thio acetothionoamido) butanes

Bis-(diamino s-triazinyl thio acetamido) pentanes

Bis-(diamino s-triazinyl thio acetamido) benzenes

Bis-(diamino s-triazinyl thio acetothionoamido) benzenes

Bis-(diamino s-triazinyl thio acetamido) toluenes

Bis-(diamino s-triazinyl thio acetothionoamido) toluenes

Bis-(diamino s-triazinyl thio acetamido) xylenes

Bis-(diamino s-triazinyl thio acetamido) naphthalenes

Bis-(diamino s-triazinyl thio acetamido) chlorobenzenes

Bis-(diamino s-triazinyl thio acetamido) octanes

Bis-(diamino s-triazinyl thio acetamido) chloronaphthalenes

Bis-(diamino s-triazinyl thio acetamido) chlorobutanes

Bis-(diamino s-triazinyl alpha-thio propanamido) ethane, more particularly alpha, beta-bis-(diamino s-triazinyl alpha-thio propanamido) ethane Bis-(diamino s-triazinyl beta-thio propanamido) ethane, more particularly alpha, beta-bis-(diamino s-triazinyl beta-thio propanamido) ethane Bis-(diamino s-triazinyl alpha-thio propanthionoamido) ethane, more particularly alpha, beta-(dis-(diamino s-triazinyl alpha-thio propanthionoamido) ethane.

Bis-(diamino s-triazinyl beta-thio propanthionoamido) ethane, more particularly alpha, beta-bis-(diamino s-triazinyl beta-thio propanthionoamido) ethane Bis-(diamino s-triazinyl alpha-thio propanamido) propanes Bis-(diamino s-triazinyl beta-thio propanamido) propanes Bis-(diamino s-triazinyl alpha-thio propanamido) butanes Bis-(diamino s-triazinyl beta-thio propanamido) butanes Bis-(diamino s-triazinyl alpha-thio propanamido) pentanes Bis-(diamino s-triazinyl beta-thio propanamido) pentanes Bis-(diamino s-triazinyl alpha-thio propanamido) benzenes Bis-(diamino s-triazinyl beta-thio propanamido) benzenes Bis-(diamino s-triazinyl alpha-thio propanamido) toluenes Bis-(diamino s-triazinyl beta-thio propanamido) toluenes Bis-(diamino s-triazinyl alpha-thio propanamido) xylenes Bis-(diamino s-triazinyl beta-thio propanamido) xylenes Bis-(diamino s-triazinyl alpha-thio propanamido) ethylbenzenes Bis-(diamino s-triazinyl beta-thio propanamido) ethylbenzenes Bis-(diamino s-triazinyl alpha-thio propanamido) naphthalenes Bis-(diamino s-triazinyl beta-thio propanamido) naphthalenes Bis-(diamino s-triazinyl alpha-thio propanamido) chlorobenzenes Bis-(diamino s-triazinyl beta-thio propanamido) chlorobenzenes Bis-(diamino s-triazinyl alpha-thio propanamido) chloronaphthalenes Bis-(diamino s-triazinyl beta-thio propanamido) chloronaphthalenes Bis-(diamino s-triazinyl alpha-thio propanamido) octanes Bis-(diamino s-triazinyl beta-thio propanamido) octanes Bis-(diamino s-triazinyl alpha-thio propanamido) chlorobutanes Bis-(diamino s-triazinyl beta-thio propanamido) chlorobutanes Bis-(diamino s-triazinyl alpha-thio propanthionoamido) benzines Bis-(diamino s-triazinyl beta-thio propanthionoamido) benzenes Bis-(diamino s-triazinyl alpha-thio propanthionoamido) toluenes Bis-(diamino s-triazinyl beta-thio propanthionoamido) toluenes
Bis-(6-amino 4-ethylamino s-triazinyl-2 beta-thio propanamido) butanes
Bis-(4-allylamino 6-butylamino s-triazinyl-2 beta-thio' alpha-butyl N-ethyl propanamido) pentanes
Bis-(4-isobutylamino 6-cyclopentylamino s-triazinyl-2 beta-thio alpha-phenyl beta-pentyl propanamido) isopentenes
Bis-(4-pentylamino 6-cyclohexylamino s-triazinyl-2 beta-thio alpha-phenyl beta-pentyl propanamido) isopentanes
Bis-(diamino s-triazinyl beta-thio alpha-ditolyl propanamido) cyclopentenes
4,4'-bis-(4''-phenylchloroethylamino 6''-phenethylamino s-triazinyl-2'' beta-thio N-benzyl propanamido) biphenyl
Alpha, alpha'-bis-(diamino s-triazinyl thio acetamido) xylene
4,4'-bis-(4'',6''-diamino s-triazinyl-2'' thio N-bromoethyl acetamido) diphenylmethane
3,4-bis-(6'-amino 4'-bromoethylamino s-triazinyl-2' beta-thio propanamido) isopropylbenzene
Bis-(6-amino 4-anilino s-triazinyl-2 thio chloropropyl N-butylphenyl acetamido) phenylethanes Additional examples of compounds that may be used as starting reactants in producing the new condensation products of the present invention are given in my above-identified copending application.

It will be understood, of course, by those skilled in the art that, in those compounds listed above that are generically named, the diamino s-triazinyl thio alkylamido (or alkylthionoamido) substituents may be attached to any two positions in the hydrocarbon or halo-hydrocarbon nucleus.

The present invention is based on my discovery that new and valuable materials of particular utility in the plastics and coating arts can be produced by effecting reaction between ingredients comprising essentially an aldehyde, including polymeric aldehydes and aldehyde-addition products, and certain bis-(triazinyl thio alkylamido) and bis-(triazinyl thio alkylthionoamido) derivatives of divalent hydrocarbons, numerous examples of which have been given above and in my above-identified copending application.

Resins heretofore have been made by condensing an aldehyde with a thioammeline ether, but such resins are not entirely satisfactory for some applications. The present invention provides resinous compositions having superior properties to the thioammeline ether-aldehyde resinous condensation products and having wider fields of utility.

In practicing my invention the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence of solvents or diluents, fillers, other natural or synthetic resinous bodies, or while admixed with other materials that also can react with the aldehydic reactant or with the triazine derivative, e. g., ketones, urea ($NH_2CONH_2$), thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the triazine derivative and the aldehyde by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising (1) urea or melamine or urea and melamine, (2) a triazine derivative of the kind herein described, for example an alpha, beta-bis-(diamino s-triazinyl thio acetamido) ethane, and (3) an aldehyde, including polymeric aldehydes and aldehyde-addition products, for instance formaldehyde, paraformaldehyde, dimethylol urea, a polymethylol melamine, e. g., hexamethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have good surface finish and excellent resistance to water and arcing.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, e. g., alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

Example 1

| | Parts |
|---|---|
| Alpha, beta-bis-(diamino s-triazinyl thio acetamido) ethane[1] | 42.6 |
| Aqueous formaldehyde (approx. 37.1% HCHO) | 48.6 |
| Aqueous ammonia (approx. 28% NH₃) | 2.5 |
| Aqueous sodium hydroxide solution (0.46 N) | 1.5 |
| Chloroacetamide (monochloroacetamide) | 0.2 |

[1] Note.—This compound also may be named alpha, beta-bis-(4,6-diamino s-triazinyl-2 thio acetamido) ethane; or alpha, beta-bis-(2,6-diamino s-triazinyl-4 thio acetamido) ethane; or alpha, beta-bis-(2,4-diamino s-triazinyl-6 thio acetamido) ethane.

All of the above components with the exception of the chloroacetamide were heated together under reflux at the boiling temperature of the mass for 10 minutes. The chloroacetamide was added to the resulting clear solution and refluxing was continued for an additional 5 minutes to cause the chloroacetamide to intercondense with the triazine derivative-formaldehyde partial condensation product. A molding (moldable) composition was made from the syrupy product by mixing therewith 31.7 parts alpha cellulose in flock form and 0.2 part of a mold lubricant, specifically zinc stearate. The wet mixture was dried at room temperature until sufficient moisture had been removed to provide a molding compound that could be molded satisfactorily. A well-molded article was produced by molding a sample of the dried and ground molding composition for 5 minutes at 140° C. under a pressure of 4,500 pounds per square inch.

Instead of using chloroacetamide as above described in accelerating the curing of the potentially reactive resinous material, heat-convertible compositions may be produced by adding to the initial reaction mixture, or to the triazine derivative-formaldehyde partial condensation product, direct or active curing catalysts (e. g., citric acid, phthalic anhydride, malonic acid, oxalic acid, etc.) or latent curing catalysts (e. g., sodium chloroacetate, N-diethyl chloroacetamide, glycine ethyl ester hydrochloride, etc.) or by intercondensation with curing reactants other than monochloroacetamide (e. g., di- and tri-chloroacetamides, chloroacetonitriles, alpha, beta-dibromopropionitrile, aminoacetamide hydrochloride, aminoacetonitrile hydrochloride, ethylene diamine monohydrochloride, ethanolamine hydrochlorides, nitrourea, chloroacetyl urea, chloroacetone, glycine, sulfamic acid, citric diamide, phenacyl chloride, etc.) Other examples of active and latent curing catalysts and of curing reactants that may be employed to accelerate or to effect the curing of the thermosetting or potentially thermosetting resins of this and other examples are given in various copending applications of mine, for instance in copending applications Serial No. 346,962, filed July 23, 1940, and Serial No. 354,395, filed August 27, 1940, both of which applications are assigned to the same assignee as the present invention.

Example 2

| | Parts |
|---|---|
| Alpha, beta-bis-(diamino s-triazinyl thio acetamido) ethane | 21.2 |
| Urea | 30.0 |
| Trimethylol melamine (crystalline) | 25.0 |
| Aqueous formaldehyde (approx. 37.1% HCHO) | 72.9 |
| Aqueous ammonia (approx. 28% NH₃) | 3.5 |
| Aqueous sodium hydroxide solution (0.46 N) | 1.7 |
| Chloroacetamide (monochloroacetamide) | 0.3 |
| Water | 50.0 |

All of the above components with the exception of the chloroacetamide were heated together under reflux at boiling temperature for 13 minutes. The chloroacetamide was added to the syrupy partial condensation product thereby obtained and refluxing was continued for an additional 5 minutes. The resulting syrup was mixed with 51.5 parts alpha cellulose in flock form and 0.3 part zinc stearate to form a molding compound. The wet composition was dried at room temperature as described under Example 1. A sample of the dried and ground molding compound was molded into the form of a disk at 140°

C. under a pressure of 4,500 pounds per square inch, using a molding time of 5 minutes. The molded disk was pulled hot from the mold. It was well cured throughout and did not become distorted upon cooling to room temperature. The molded piece had a well-knit and homogeneous structure and excellent resistance to water, as evidenced by the fact that when immersed in boiling water for 15 minutes followed by immersion in cold water for 5 minutes it absorbed only 0.75% by weight of water. The molding compound showed excellent flow characteristics during molding.

*Example 3*

| | Parts |
|---|---|
| Alpha, beta-bis-(diamino s-triazinyl thio acetamido) ethane | 12.8 |
| Melamine | 37.8 |
| Aqueous formaldehyde (approx. 37.1% HCHO) | 81.0 |
| Aqueous ammonia (approx. 28% NH$_3$) | 1.9 |
| Aqueous sodium hydroxide solution (0.46 N) | 2.2 |
| Chloroacetamide | 0.3 |

All of the above components with the exception of the chloroacetamide were heated together under reflux at boiling temperature for 10 minutes, yielding a clear syrup. The chloroacetamide was now added and refluxing was continued for an additional 3 minutes. The resulting syrupy intercondensation product was mixed with 45.3 parts alpha cellulose and 0.2 part zinc stearate to form a molding compound. The wet compound was dried at room temperature as in the previous examples. A sample of the dried and ground molding composition was molded for 3½ minutes at 140° C. under a pressure of 4,500 pounds per square inch. The molded piece was well cured throughout, had a well-knit and homogeneous structure and a smooth, glossy surface finish. The hot, molded article after extraction from the mold did not become distorted upon cooling to room temperature, further indicating that it was well cured. The molded piece was exceptionally high in its resistance to water, as shown by the fact that it absorbed only 0.19% by weight of water when tested for its water-resistance characteristics as described under Example 2. The molding compound showed good plastic flow during molding.

Other curing agents such as mentioned under Example 1 may be substituted for the chloroacetamide in the above formula.

*Example 4*

A phenol-formaldehyde liquid partial condensation product was prepared by heating together 90 parts phenol and 195 parts of an aqueous formaldehyde solution containing approximately 37.1% HCHO for 4 hours at 65° to 70° C., using 2.85 parts of potassium carbonate as a condensation catalyst. This partial condensation product is described in the following formula as "phenolic resin syrup":

| | Parts |
|---|---|
| Phenolic resin syrup | 60.0 |
| Alpha, beta-bis-(diamino s-triazinyl thio acetamido) ethane | 12.8 |
| Aqueous sodium hydroxide solution (0.46 N) | 1.0 |
| Oxalic acid | 1.1 |

All of the above ingredients with the exception of the oxalic acid were heated together under reflux at the boiling temperature of the mass for 10 minutes. The oxalic acid dissolved in a small amount of water was now added to the reaction mass. A molding composition was made from the resulting syrupy condensation product by mixing it with 25.0 parts alpha cellulose and 0.1 part zinc stearate. The homogeneous molding compound was dried at room temperature as in the previous examples. A sample of the dried and ground molding composition was molded into the form of a disk at 140° C. under a pressure of 4,500 pounds per square inch, using a molding time of 10 minutes. The molded disk was well cured throughout and had a well-knit structure. After being pulled hot from the mold, the molded piece did not become distorted upon cooling to room temperature. The molded article had excellent water resistance as shown by the fact that, when tested for its water-resistance as described under Example 2, it absorbed only 0.97% by weight of water. The molding compound showed good plastic flow during molding.

*Example 5*

| | Parts |
|---|---|
| Alpha, beta-dis-(diamino s-triazinyl thio acetamido) ethane | 21.3 |
| Sulfanilamide | 8.6 |
| Aqueous formaldehyde (approx. 37.1% HCHO) | 40.5 |
| Aqueous sodium hydroxide solution (0.46 N) | 2.0 |
| Chloroacetamide | 0.2 |

All of the above ingredients with the exception of the chloroacetamide were heated together under reflux at boiling temperature for 10 minutes. The chloroacetamide was added to the syrupy partial condensation product thereby obtained and the resulting mixture immediately was mixed with 24.1 parts alpha cellulose and 0.1 part zinc stearate to form a molding compound. The wet molding composition was dried at room temperature as described under the previous examples. A well-cured molded disk, having a well-knit and homogeneous structure, was produced by molding a sample of the dried and ground molding compound for 5 minutes at 140° C. under a pressure of 4,500 pounds per square inch. The molded piece had a water-absorption value of 3.1% when tested for its water-resistance characteristics as described under Example 2. Good flow during molding was indicated by the flash remaining on the molded piece. The molded piece could be pulled hot from the mold without warping and did not become distorted upon cooling to room temperature.

*Example 6*

| | Parts |
|---|---|
| Alpha, beta-bis-(diamino s-triazinyl thio acetamido) ethane | 12.8 |
| Thiourea | 22.8 |
| Aqueous formaldehyde (approx. 37.1% HCHO) | 56.7 |
| Aqueous ammonia (approx. 28% NH$_3$) | 4.0 |
| Aqueous sodium hydroxide solution (0.46 N) | 2.0 |
| Chloroacetamide | 0.4 |

With the exception of the chloroacetamide, all of the above components were heated together under reflux at boiling temperature for 18 minutes, after which the chloroacetamide was added and refluxing was continued for an additional 5 minutes. The resulting resinous syrup was mixed with 33 parts alpha cellulose and 0.2 part zinc stearate to form a molding compound. The wet molding composition was dried at room temperature as described in the previous examples. A well-cured molded disk was produced by molding a sample of the dried and ground molding compound for 5 minutes at 140° C. under a pressure of 4,500 pounds per square inch. The molded article had a well-knit and homogeneous structure and good water resistance, as shown by the fact that it absorbed only 1.9% by weight of water when tested for its water resistance as described under Example 2. The molding compound showed good plastic flow during molding.

Example 7

|  | Parts |
| --- | --- |
| Alpha, beta-bis-(diamino s-triazinyl thio acetamido) ethane | 12.8 |
| 1-phenyl guanazole | 13.1 |
| Aqueous formaldehyde (approx. 37.1% HCHO) | 28.1 |
| Aqueous ammonia (approx. 28% NH₃) | 2.0 |
| Aqueous sodium hydroxide solution (0.46 N) | 1.0 |
| Chloracetamide | 0.2 |

All of the above components with the exception of the 1-phenyl guanazole were heated together on a steamplate for 5 minutes, at the end of which period of time a clear syrup had formed. The phenyl guanazole was now added and heating was continued until a resinous layer began separating from the reaction mass. A molding compound was made by mixing the reaction product with 19.1 parts alpha cellulose and 0.1 part zinc stearate. The wet molding compound was dried at room temperature as described in previous examples. A well-cured molded piece, having a well-knit and homogeneous structure, was obtained by molding a sample of the dried and ground molding composition for 5 minutes at 140° C. under a pressure of 4,500 pounds per square inch. The molded article had a water-absorption value of 3.7% when tested for its water-resistance as described under Example 2. The flash on the molded piece indicated that the molding compound had good flow characteristics during molding.

Example 8

|  | Parts |
| --- | --- |
| Alpha, beta-bis-(diamino s-triazinyl thio acetamido) ethane | 21.2 |
| Urea | 30.0 |
| Aqueous formaldehyde (approx. 37.1% HCHO) | 72.9 |
| Aqueous ammonia (approx. 28% NH₃) | 3.5 |
| Aqueous sodium hydroxide solution (0.46 N) | 1.7 |
| Water | 20.0 |
| Chloroacetamide | 0.4 |

All of the above components with the exception of the chloroacetamide were heated together under reflux at the boiling temperature of the mass for 13 minutes. The chloroacetamide was now added and refluxing was continued for an additional 5 minutes. The syrupy intercondensation product thereby obtained was mixed with 43.2 parts alpha cellulose and 0.2 part zinc stearate to form a molding compound. The wet molding composition was dried at room temperature until sufficient moisture had been removed to yield a compound that could be molded satisfactorily. A sample of the dried and ground molding composition was molded for 5 minutes at 140° C. under a pressure of 4,500 pounds per square inch. The molded article was well cured throughout and had a well-knit and homogeneous structure. The effect of the triazine derivative in improving the water resistance of the resinous material and of molded articles made from molding compounds prepared from such resin is shown by the fact that the molded piece had a water-absorption value (determined as described under Example 2) of only 2.6% as compared with water-absorption values of 5% to 7% for molded articles prepared from urea-formaldehyde molding compositions having no such triazine derivative incorporated into the resinous binder. The flash on the molded article showed that the molding compound had good flow characteristics during molding.

Example 9

|  | Parts |
| --- | --- |
| Alpha, beta-bis-(diamino s-triazinyl thio acetamido) ethane | 42.6 |
| Furfural | 192.0 |
| Aqueous ammonia (approx. 28% NH₃) | 3.0 |
| Aqueous sodium hydroxide solution (0.46 N) | 1.5 |

The above ingredients were heated together under reflux at boiling temperature for 15 minutes. The syrupy condensation product was tested for its curing characteristics by treating small samples of it with sulfamic acid and glycine and heating the resulting mixture on a 140° C. hotplate. These agents caused the resinous syrup to convert to a cured or insoluble and infusible state. Instead of glycine or sulfamic acid, other curing agents such as mentioned under Example 1 may be employed.

Example 10

|  | Parts |
| --- | --- |
| Alpha, beta-bis-(diamino s-triazinyl thio acetamido) ethane | 42.6 |
| Acrolein | 33.6 |
| Aqueous sodium hydroxide solution (0.46 N) | 1.5 |
| Water | 100.0 |

The above components were mixed (the acrolein being added last) and then refluxed at boiling temperature for 18 minutes. An exothermic reaction took place immediately after the addition of the acrolein. At the end of the reflux period, the resinous reaction product was tested for its curing characteristics by treating small samples of it with such curing agents as glycine, sulfamic acid, chloroacetamide, polysalicylide, chloroacetyl urea, alpha, beta-dibromopropionitrile and others such as mentioned under Example 1, followed by heating on a 140° C. hotplate. Infusible solids were obtained in all cases. The cured resins could be removed from the hotplate in thin, well-cohered sheets. The resinous material of this example could be used in the production of molding compositions or as a modifier of other synthetic or natural resins.

Example 11

|  | Parts |
| --- | --- |
| Alpha, beta-bis-(diamino triazinyl thio acetamido) ethane | 42.6 |
| Acetamide | 5.8 |
| Aqueous formaldehyde (approx. 37.1% HCHO) | 81.0 |
| Aqueous ammonia (approx. 28% NH₃) | 3.0 |
| Aqueous sodium hydroxide solution (0.46 N) | 1.5 |
| Water | 50.0 |

The above ingredients were heated together under reflux at the boiling temperature of the mass for 21 minutes. The resulting syrupy condensation product was tested for its curing characteristics by treating small samples of it with glycine, sulfamic acid, phenacyl chloride and other curing agents such as mentioned under Example 1. The plasticizing effect of the acetamide was apparent from the longer time it required for the resin to convert at 140° C., while admixed with the curing agent, to an insoluble and infusible state. The resinous material of this example would be suitable for use as a modifier of aminoplasts of high resistance to flow to improve their plasticity or flow characteristics.

*Example 12*

| | Parts |
|---|---|
| Alpha, beta-bis-(diamino s-triazinyl thio acetamido) ethane | 42.6 |
| Butyl alcohol | 74.0 |
| Aqueous formaldehyde (approx. 37.1% HCHO) | 81.0 |
| Aqueous sodium hydroxide solution (approx. 0.46 N) | 1.5 |

A clear, resinous syrup was produced by heating all of the above components together under reflux at boiling temperature for 17 minutes. A portion of the syrup was dehydrated by heating it on a steamplate. The dehydrated resin was found to be soluble in benzyl alcohol, butyl alcohol, ethylene glycol, dioxane, Cellosolve and other organic solvents. To another portion of the syrup was added a small amount of a curing agent, specifically hydrochloric acid. A glass plate was coated with a sample of the resulting syrup and the coated plate was baked for about 16 hours at 70° C. The baked film was water-white, transparent, water-resistant, hard and tightly adherent to the glass plate. The solubility and film-forming characteristics of the resinous composition of this example make it especially suitable for use in the production of spirit and baking varnishes. It may be used as a modifier of varnishes of the alkyd-resin types.

*Example 13*

| | Parts |
|---|---|
| Alpha, beta-bis-(diamino s-triazinyl thio acetamido) ethane | 42.6 |
| Diethyl malonate | 16.0 |
| Aqueous formaldehyde (approx. 37.1% HCHO) | 81.0 |
| Aqueous ammonia (approx. 28% NH₃) | 3.0 |
| Aqueous sodium hydroxide solution (0.46 N) | 1.5 |
| Water | 50.0 | were heated together under reflux at boiling temperature for 18 minutes, yielding a clear syrup. This syrup was potentially heat-hardenable as evidenced by the fact that, when glycine, sulfamic acid, chloroacetamide and other curing agents such as mentioned under Example 1 were added either to the syrupy condensation product or to the dehydrated resin, resinous materials were obtained that cured at 140° C. to an insoluble and infusible state. The resinous composition of this example has greater plasticity than resins similarly produced in the absence of the diethyl malonate. It is especially suitable for use in the production of molding compositions where high flow during molding is required, as in the production of molded articles of intricate design and of thin cross-section. It also may be employed as a modifier of more rapidly curing aminoplasts to control their curing properties.

*Example 14*

| | Parts |
|---|---|
| Alpha, beta-bis-(diamino s-triazinyl thio acetamido) ethane | 42.6 |
| Glycerine | 9.2 |
| Aqueous formaldehyde (approx. 37.1% HCHO) | 81.0 |
| Aqueous ammonia (approx. 28% NH₃) | 3.0 |
| Aqueous sodium hydroxide solution (0.46 N) | 1.5 |
| Water | 50.0 | were heated together under reflux at the boiling temperature of the mass for 15 minutes, yielding a clear, resinous syrup. The dehydrated syrup was soluble in butyl alcohol, ethylene glycol, benzyl alcohol, dioxane and Cellosolve. A small amount of a curing agent, specifically hydrochloric acid, was added to one portion of the dehydrated resin. A glass plate was coated with the acid-treated resin and another glass plate was coated with the unmodified resin. Both coated plates were baked in an oven at 70° C. for about 16 hours. In each case a baked film was obtained that was hard, smooth, glossy, transparent, water-white, water-resistant and tightly adherent to the glass surface. The acidified resin yielded a film that was somewhat harder than that given by the unmodified resin. The resinous material of this example, either with or without a curing agent, is especially suitable for use in the production of coating compositions.

*Example 15*

| | Parts |
|---|---|
| Alpha, beta-bis-(diamino s-triazinyl thio acetamido) ethane | 42.6 |
| Polyvinyl alcohol | 4.4 |
| Aqueous formaldehyde (approx. 37.1% HCHO) | 81.0 |
| Aqueous sodium hydroxide solution (0.46 N) | 1.5 |
| Water | 50.0 |

A clear syrup was obtained by heating the above components together under reflux at boiling temperature for 10 minutes. A thermoplastic resin was produced when a sample of the syrupy condensation product was dehydrated on a 140° C. hotplate. However, when curing agents such as glycine, sulfamic acid, chloroacetamide and others such as mentioned under Example 1 were added either to the syrupy condensation product or to the dehydrated resin, followed by heating at 140° C., insoluble and infusible solids were obtained. A glass plate was coated with a sample of the resinous syrup to which had been added a small amount of a curing agent, specifically hydrochloric acid. The coated plate was baked for several hours at 70° C. The baked film was very hard, water-resistant and tightly adherent to the glass surface. The resinous material of this example is suitable for use in the production of liquid coating materials and molding compounds.

The aldehydes mentioned in the above illustrative examples may be replaced in whole or in part by an equivalent amount of an aldehyde-addition product, for example a methylol urea, specifically monomethylol urea or dimethylol urea, a methylol aminotriazine (e. g., a monomethylol aminotriazine such as monomethylol melamine or a polymethylol aminotriazine, specifically a polymethylol melamine such as di, tri-, tetra-, penta- or hexa-methylol melamines), a methylol diazine, e. g., trimethylol pyrimidine, a methylol guanazole, e. g., dimethylol guanazole, etc.

It will be understood, of course, by those skilled in the art that my invention is not limited to condensation products obtained by reaction of ingredients comprising an aldehyde and the specific triazine derivative mentioned in the above illustrative examples. Thus, instead of alpha, beta-bis-(diamino s-triazinyl thio acetamido) ethane mentioned in the above examples, any other triazine derivative of the kind with which this invention is concerned may be employed, including the bis-(diamino s-triazinyl thio acetamido)-substituted aliphatic hydrocarbons, more particularly the bis-(diamino s-triazinyl thio acetamido) alkanes, e. g., the bis-(diamino s-triazinyl thio acetamido) propanes, the bis-(diamino s-triazinyl thio acetamido) butanes, etc., the bis-(diamino s-triazinyl thio acetamido)-substituted aromatic hydrocarbons, e. g., the bis-(diamino s-triazinyl thio acetamido) benzenes, the bis-(diamino s-triazinyl thio acetamido) toluenes, etc., and others such as mentioned hereinbefore and in my copending application Serial No. 418,220 by way of illustration.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, valeraldehyde, caproaldehyde, crotonaldehyde, methacrolein, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly of the mono- and poly-methylol derivatives of urea, thiourea, selenourea and iminourea, substituted ureas, selenoureas, thioureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminodiazines, etc. Particularly good results are obtained with active methylene-containing bodies such as the methylol ureas and the methylol melamines, specific examples of which have been given hereinbefore. Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range, but ordinarily the reactants are employed in an amount corresponding to at least one mol of the aldehyde, specifically formaldehyde, for each mol of the triazine derivative. Thus, I may use, for example, from one to eight or ten mols of an aldehyde for each mol of triazine derivative. When the aldehyde is available for reaction in the form of an alkylol derivative, more particularly a methylol derivative such, for instance, as dimethylol urea, hexamethylol melamine, etc., then higher amounts of such aldehyde-addition products are used, for instance, from 2 or 3 up to 15 or 20 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc; amides such as formamide, stearamide, acryloamide, benzamide, toluene sulfonamides, benzene disulfonamides, benzene trisulfonamides, adipic diamide, phthalamide, etc.; amines such as ethylene diamine; phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my copending applications Serial No. 289,273, filed August 9, 1939, now Patent No. 2,281,559, issued May 5, 1942, and Serial No. 400,649, filed July 1, 1941; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazine derivative of the kind herein described and an aldehyde, e. g., formaldehyde, I may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicyclic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and under pressures of the order of 1,000 to 5,000 pounds or more per square inch.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

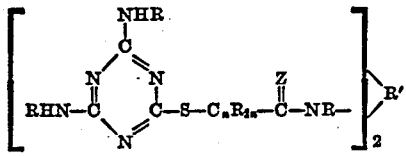

where $n$ represents an integer and is at least 1 and not more than 2, Z represents a member of the class consisting of oxygen and sulfur, R represents a member of the class consisting of hydrogen and monovalent hydrocarbon and halohydrocarbon radicals, and R' represents a member of the class consisting of divalent hydrocarbon and halo-hydrocarbon radicals.

2. A composition as in claim 1 wherein the aldehyde is formaldehyde.

3. A composition as in claim 1 wherein the reaction product is the product obtained by effecting initial reaction between the specified components under alkaline conditions.

4. A composition of matter comprising the reaction product of ingredients comprising an aldehyde and a compound corresponding to the general formula

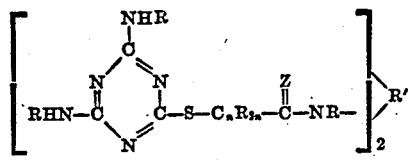

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

5. A heat-curable resinous composition comprising a heat-convertible condensation product of ingredients comprising formaldehyde and a compound corresponding to the general formula

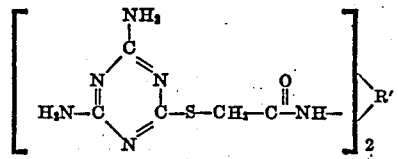

where R' represents a member of the class consisting of divalent hydrocarbon and halo-hydrocarbon radicals.

6. A product comprising the heat-cured resinous composition of claim 5.

7. A resinous composition comprising the product of reaction of an aldehyde and a bis-(diamino s-triazinyl thio acetamido)-substituted aliphatic hydrocarbon.

8. A resinous composition comprising the product of reaction of ingredients comprising an aldehyde and a bis-(diamino s-triazinyl thio acetamido) alkane.

9. A composition comprising the resinous product of reaction of ingredients comprising formaldehyde and alpha, beta-bis-(diamino s-triazinyl thio acetamido) ethane.

10. A resinous composition comprising the product of reaction of an aldehyde and a bis-(diamino, s-triazinyl thio acetamido)-substituted aromatic hydrocarbon.

11. A composition comprising the product of reaction of ingredients comprising a urea, an aldehyde and a compound corresponding to the general formula

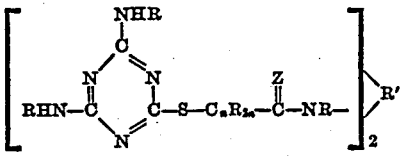

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

12. A composition as in claim 11 wherein the urea component is the compound corresponding to the formula $NH_2CONH_2$ and the aldehyde is formaldehyde.

13. A heat-curable resinous composition comprising the heat-convertible resinous reaction product of (1) a partial condensation product of ingredients comprising formaldehyde and a compound corresponding to the general formula

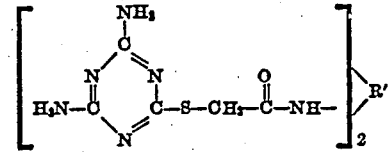

where R' represents a divalent hydrocarbon radical, and (2) a curing reactant.

14. A resinous composition as in claim 13 wherein the curing reactant is a chlorinated acetamide.

15. A composition comprising the resinous product of reaction of ingredients comprising urea, formaldehyde and alpha, beta-bis-(diamino s-triazinyl thio acetamido) ethane.

16. A composition containing the resinous product of reaction of ingredients comprising dimethylol urea and alpha, beta-bis-(diamino s-triazinyl thio acetamido) ethane.

17. A composition comprising the resinous product of reaction of ingredients comprising melamine, formaldehyde and alpha, beta-bis-(diamino s-triazinyl thio acetamido) ethane.

18. A composition containing the resinous product of reaction of ingredients comprising a polymethylol melamine and alpha, beta-bis-(diamino s-triazinyl thio acetamido) ethane.

19. A resinous composition comprising the product of reaction of (1) a partial condensation product of ingredients comprising urea, formaldehyde and alpha, beta-bis-(diamino s-triazinyl thio acetamido) ethane, and (2) a chlorinated acetamide.

20. The method of preparing new condensation products which comprises effecting reaction between ingredients comprising an aldehyde and a compound corresponding to the general formula

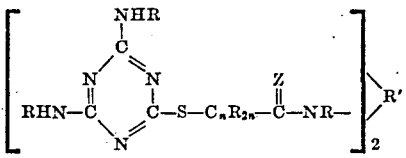

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

GAETANO F. D'ALELIO.

Certificate of Correction

Patent No. 2,312,696.　　　　　　　　　　　　　　　　　　　　　　March 2, 1943.

GAETANO F. D'ALELIO

It is hereby certified that errors appear in the printed specification of the above numbered patent requiring correction as follows: Page 2, first column, line 42, after the word "acetamido" insert a closing parenthesis; and second column, line 15, for "beta-(dis-" read *beta-bis-*; line 71, for "benzines" read *benzenes*; page 4, second column, line 39, after "etc.)" insert a period; page 5, first column, line 26, after "minutes" strike out the period and insert instead a comma; and second column, line 22, Example 5, for "beta-dis-" read *beta-bis-*; page 6, first column, line 32, before the word "previous" insert *the;* page 7, second column, line 73, for "di," read *di-*; page 8, second column, line 47, after "e. g." strike out the semicolon and insert instead a comma; page 9, first column, line 45, for "halohydrocarbon" read *halo-hydrocarbon*; line 62, for that part of the formula reading "$C_nR_{2n}$" read $C_nH_{2n}$; and second column, lines 5-6, in the formula, for

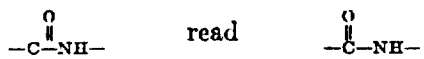

and that the said Letters Patent should be read with these corrections therein that the same may conform to the record of the case in the Patent Office.

Signed and sealed this 8th day of June, A. D. 1943.

[SEAL]

HENRY VAN ARSDALE,
　　　　　　　　　　　　　　　　　　　　　　　　　　*Acting Commissioner of Patents.*